(12) United States Patent
Willey et al.

(10) Patent No.: US 7,729,063 B2
(45) Date of Patent: Jun. 1, 2010

(54) SCREW ACTUATED NIGHT VISION GOGGLE TILT MECHANISM

(75) Inventors: Charles D. Willey, Roanoke, VA (US); Todd Michael Neff, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/945,389

(22) Filed: Nov. 27, 2007

(65) Prior Publication Data

US 2009/0135506 A1 May 28, 2009

(51) Int. Cl.
*G02B 27/14* (2006.01)
*G02B 7/02* (2006.01)
*A42B 3/30* (2006.01)
*A42B 3/00* (2006.01)
*G09G 5/00* (2006.01)

(52) U.S. Cl. .................. 359/815; 359/630; 359/631; 2/6.2; 345/8

(58) Field of Classification Search .............. 359/815, 359/407–409, 630–631; 2/6.2, 6.7; 345/8
See application file for complete search history.

(56) References Cited

U.S. PATENT DOCUMENTS 4,449,787 A * 5/1984 Burbo et al. ............. 313/524

| 5,506,730 | A  | * | 4/1996  | Morley et al. ............. 359/815 |
|-----------|----|---|---------|-----------------------------------|
| 6,662,370 | B1 |   | 12/2003 | Buchanan, Jr.                     |
| 6,924,931 | B1 |   | 8/2005  | Lam et al.                        |
| 2006/0143764 | A1 | * | 7/2006 | Reed et al. ................... 2/6.2 |

FOREIGN PATENT DOCUMENTS

| GB | 2 167 644 A     | 6/1986  |
|----|-----------------|---------|
| GB | 2 424 822 A     | 10/2006 |
| WO | WO 2004/090580 A3 | 10/2004 |
| WO | WO 2006/062967 A1 | 6/2006  |

* cited by examiner

*Primary Examiner*—Jessica T Stultz
*Assistant Examiner*—Mahidere S Sahle
(74) *Attorney, Agent, or Firm*—RatnerPrestia

(57) ABSTRACT

A mechanism for adjusting the angular position of an optical device with respect to a field helmet is disclosed. The mechanism includes an optical device mounting component for coupling to the optical device. A field helmet mounting component is provided for coupling to the field helmet. The field helmet mounting component is rotatably coupled to the optical device mounting component about an axis of rotation. An angular adjustment mechanism is engaged between the optical device mounting component and the field helmet mounting component. The angular adjustment mechanism includes a translating member that is moveably translatable along an axis of translation for engaging a surface of either the field helmet mounting component or the optical device mounting component. Translation of the translating member along the axis of translation induces rotation of the optical device mounting component about the axis of rotation for adjusting the angular position of the optical device.

10 Claims, 12 Drawing Sheets

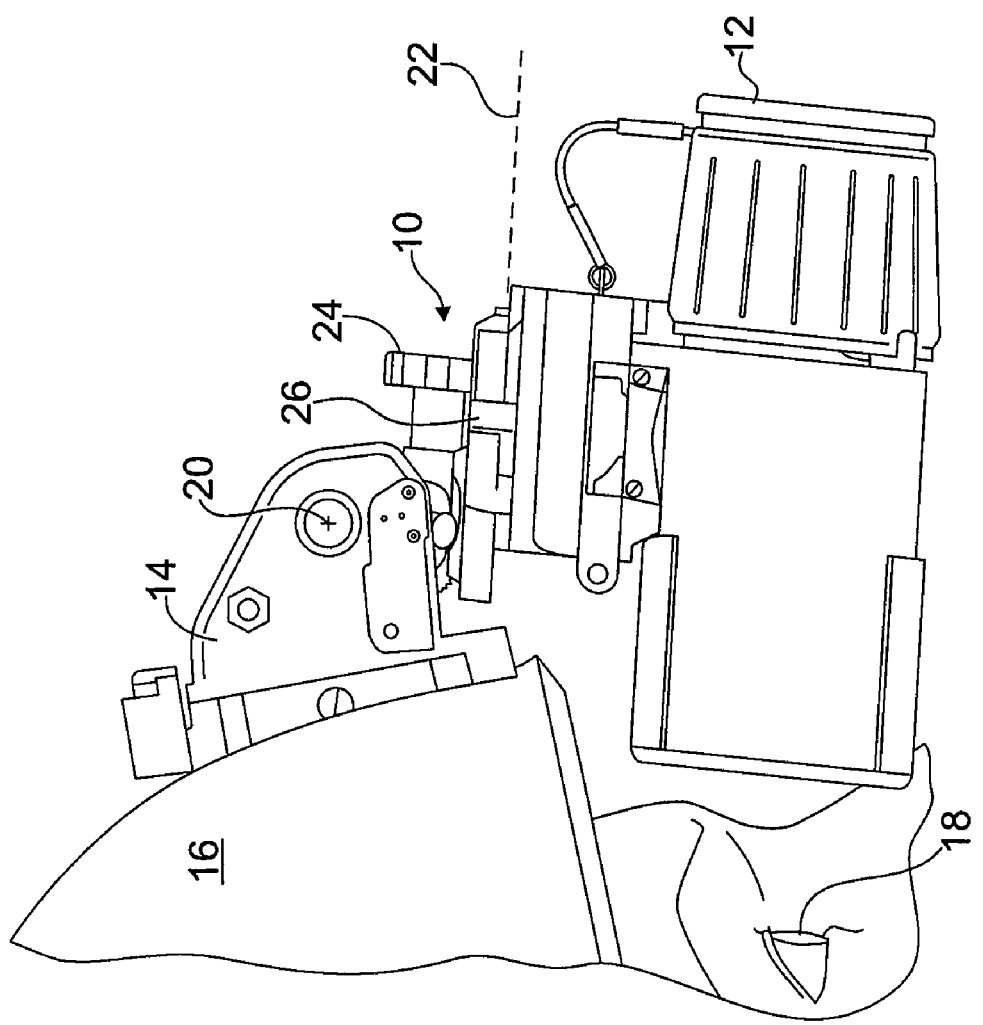

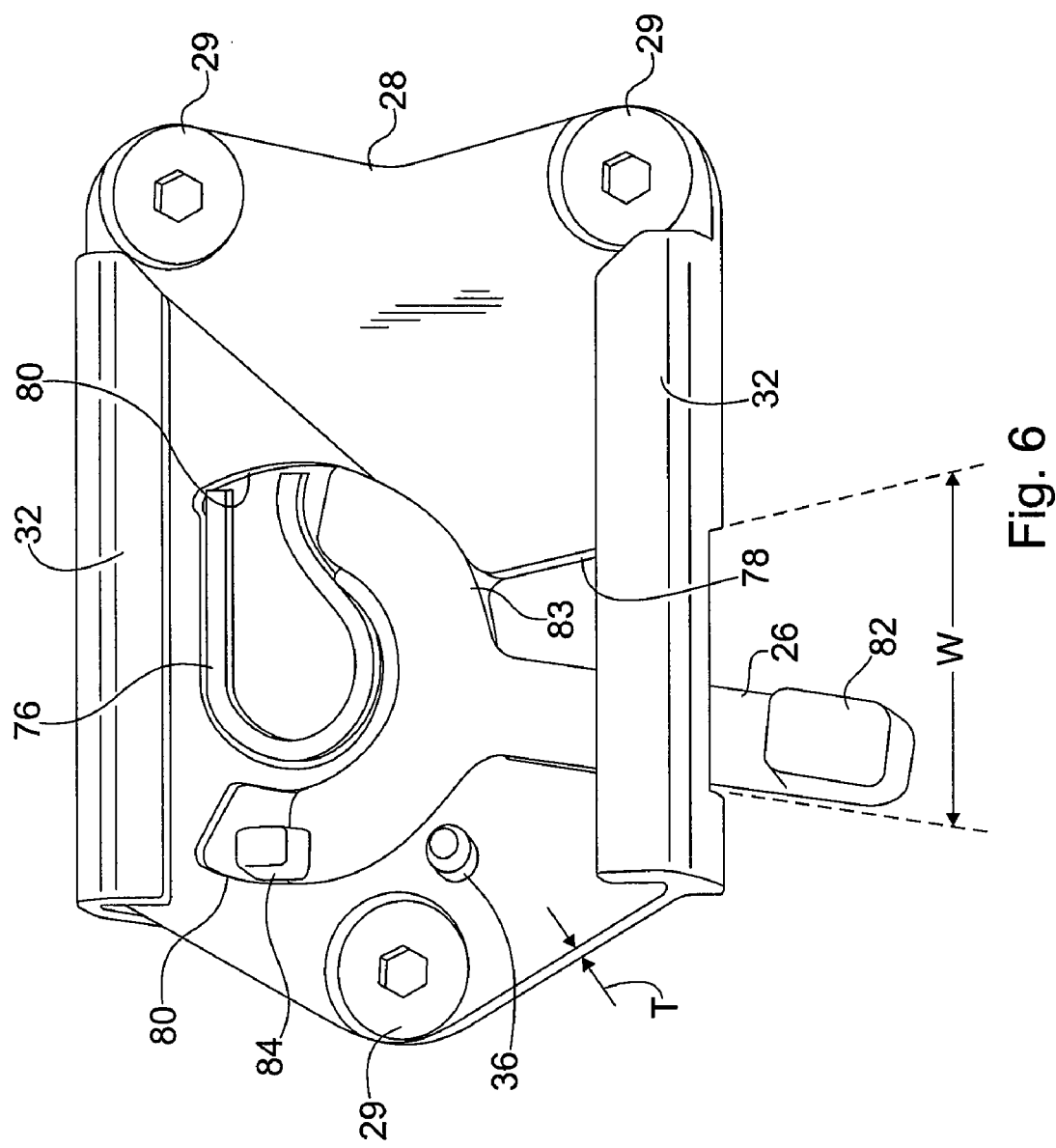

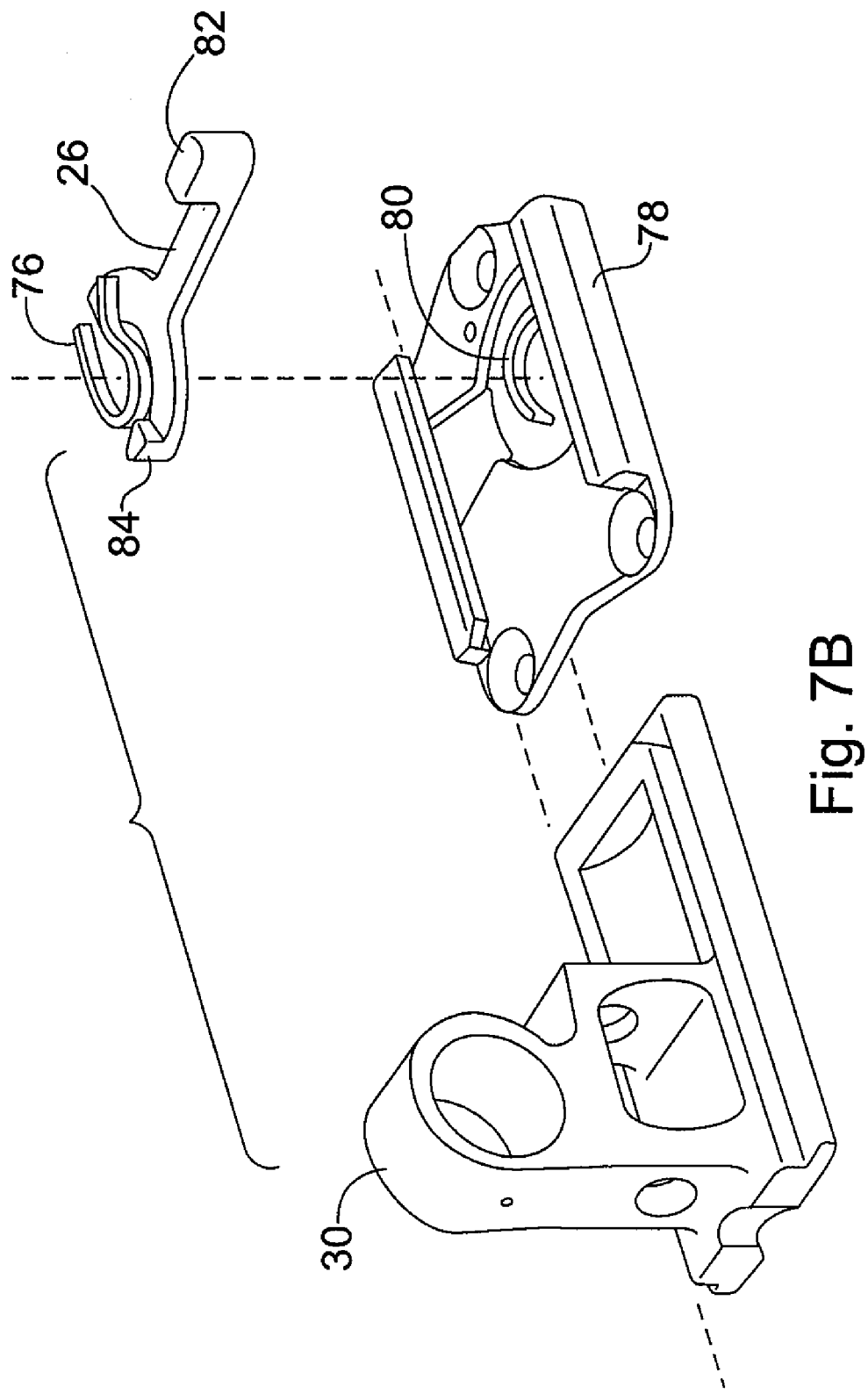

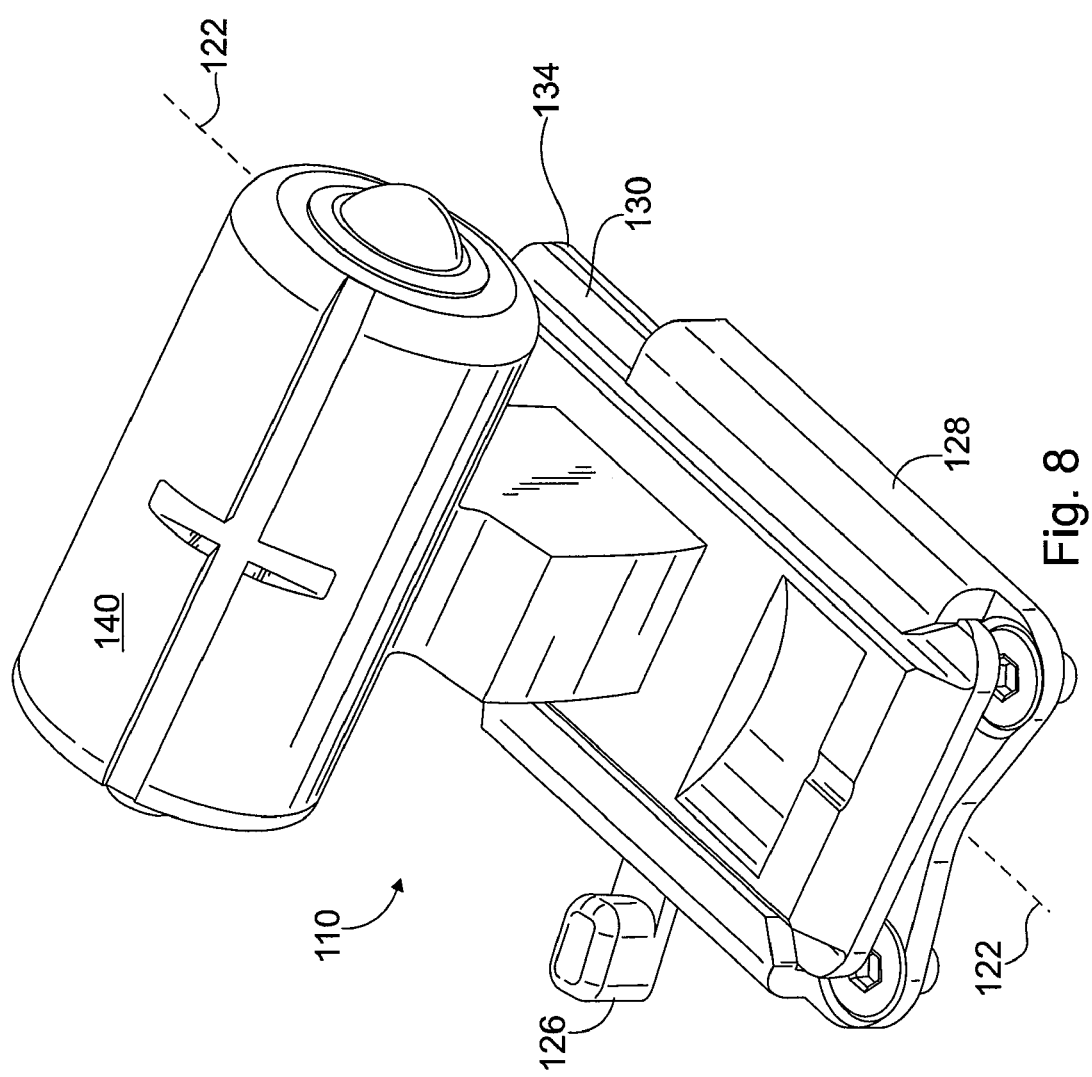

SCREW ACTUATED NIGHT VISION GOGGLE TILT MECHANISM

TECHNICAL FIELD

The present invention relates to helmet mounting systems for integrating an optical vision device, such as a night vision device, with a field helmet.

BACKGROUND OF THE INVENTION

Field helmet mounted optical devices, such as night vision devices, are designed for a wide variety of uses. Users typically operate the night vision device in a variety of positions, such as standing erect, lying flat on the ground, sitting in a cockpit of an airplane, hiding behind protective cover, and so forth. Given the variety of positions a user may operate a night vision device, it would be beneficial to provide adjustments for tilting (i.e., rotating) and translating the optical device with respect to the field helmet for adapting the night vision device to the body orientation of the user.

Additionally, helmet mounted night vision devices frequently require translational adjustments with respect to the field helmet to accommodate anthropometric variation of multiple users or to accommodate additional equipment worn by the user, such as, gas masks or glasses.

Thus, there is a continuing need to further develop devices for adjustable and/or removable mounting of an optical device to a field helmet in the interests of enhanced functionality, cost and convenience.

SUMMARY OF THE INVENTION

According to an aspect of the invention, a mechanism for adjusting the angular position of an optical device with respect to a field helmet is provided. The mechanism includes an optical device mounting component for coupling to the optical device. A field helmet mounting component is provided for coupling to the field helmet. The field helmet mounting component is rotatably coupled to the optical device mounting component about an axis of rotation. An angular adjustment mechanism is engaged between the optical device mounting component and the field helmet mounting component. The angular adjustment mechanism includes a translating member that is moveably translatable along an axis of translation for engaging a surface of either the field helmet mounting component or the optical device mounting component. Translation of the translating member along the axis of translation induces rotation of the optical device mounting component about the axis of rotation for adjusting the angular position of the optical device with respect to the field helmet.

According to another aspect of the invention, the angular adjustment mechanism includes a pin being moveably translatable along an axis of translation and positioned within a slot of the field helmet mounting component. Translation of the pin along the axis of translation induces rotation of the optical device mounting component about the axis of rotation for adjusting the angular position of the optical device with respect to the field helmet.

According to yet another aspect of the invention, a night vision apparatus configured for attachment to a field helmet is provided. The night vision apparatus includes a night vision device and a mechanism for adjusting the angular position of the night vision device.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures:

FIG. 1A depicts a night vision device mounted to a field helmet according to an aspect of this invention, wherein the night vision device is oriented in a deployed position and proximal to the eye of the user;

FIG. 6 depicts a partial assembly view of the optical device adjustment mechanism of FIG. 2 illustrating an optical device mounting component, and a spring-loaded lever biased in a locked position;

FIGS. 7A and 7B depict exploded partial assembly views of the optical device adjustment mechanism of FIG. 2 illustrating a spring-loaded lever, an intermediate component and an optical device mounting component;

FIG. 8 depicts a perspective view from the top side of an optical device adjustment mechanism, according to another exemplary embodiment of the invention, wherein the optical device adjustment mechanism is configured to permit translation of an optical device with respect to a field helmet.

DETAILED DESCRIPTION OF THE INVENTION

Figure 1B:
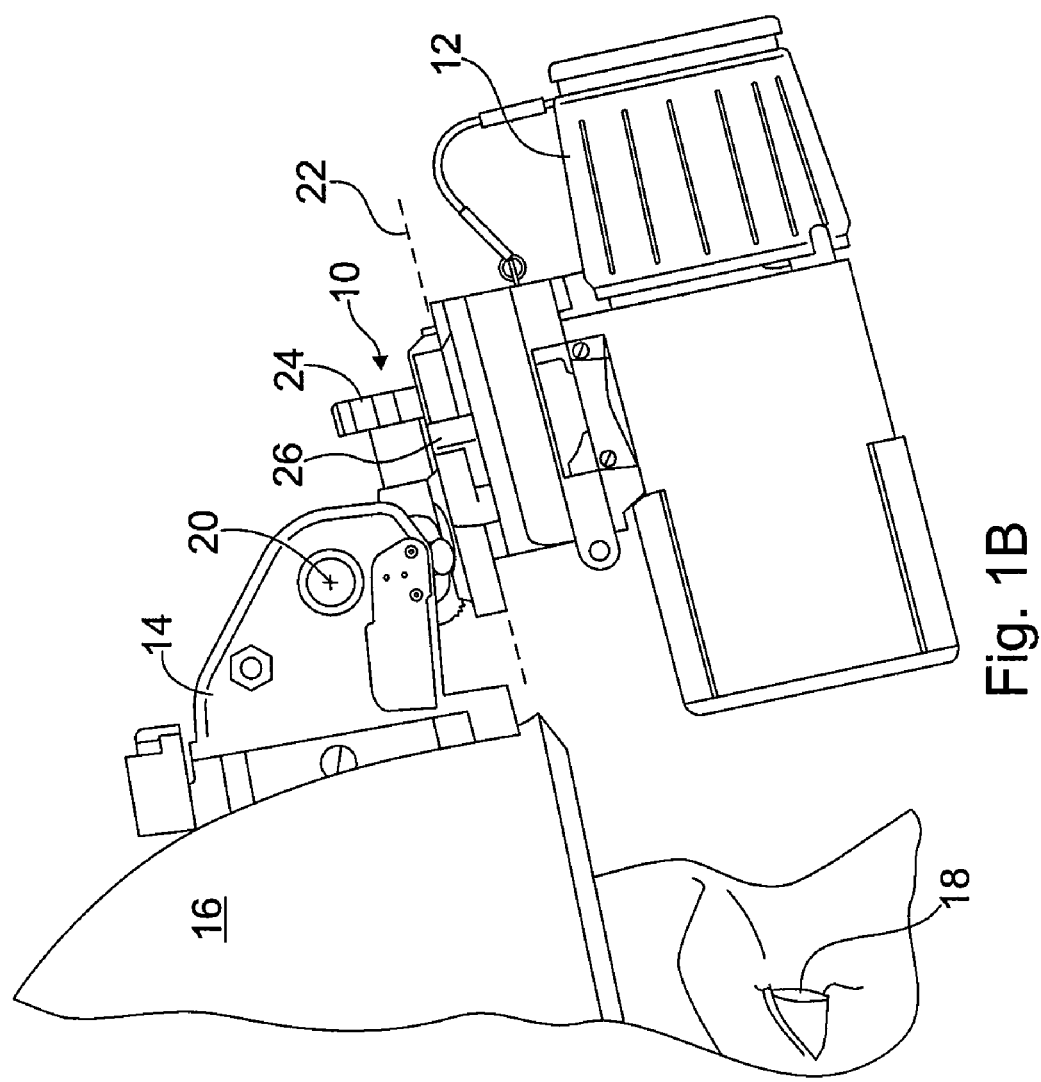
FIG. 1B depicts the night vision device of FIG. 1A oriented in a deployed position and distal to the eye of the user.

This invention will now be described with reference to several embodiments selected for illustration in the drawings. It will be appreciated that the scope and spirit of the invention are not limited to the illustrated embodiments.

Referring generally to the figures and according to an aspect of the invention, a mechanism 10, 210 for adjusting the angular position of an optical device 12 with respect to a field helmet 16 is provided. The mechanism 10, 210 includes an optical device mounting component 28, 228 for coupling to the optical device 12. A field helmet mounting component 40, 240 is provided for coupling to the field helmet 16. The field helmet mounting component 40, 240 is rotatably coupled to the optical device mounting component 28, 228 about an axis of rotation 20. An angular adjustment mechanism is engaged between the optical device mounting component 28, 228 and the field helmet mounting component 40, 240. The angular adjustment mechanism 50 includes a translating member 56 that is moveably translatable along an axis of translation for engaging a surface 45 of either the field helmet mounting component 40, 240 or the optical device mounting component 28, 228. Translation of the translating member 56 along the axis of translation induces rotation of the optical device mounting component 28, 228 about the axis of rotation 20 for adjusting the angular position of the optical device 12 with respect to the field helmet 16.

According to another aspect of the invention, the angular adjustment mechanism 50 includes a pin 56 being moveably translatable along an axis of translation and positioned within a slot 45 of the field helmet mounting component 40, 240. Translation of the pin 56 along the axis of translation induces rotation of the optical device mounting component 28, 228 about the axis of rotation 20 for adjusting the angular position of the optical device 12 with respect to the field helmet 16.

According to yet another aspect of the invention, a night vision apparatus 10 and 12 configured for attachment to a field helmet 16 is provided. The night vision apparatus includes a night vision device 12 and a mechanism 10 for adjusting the angular position of the night vision device 12.

Figure 1C:
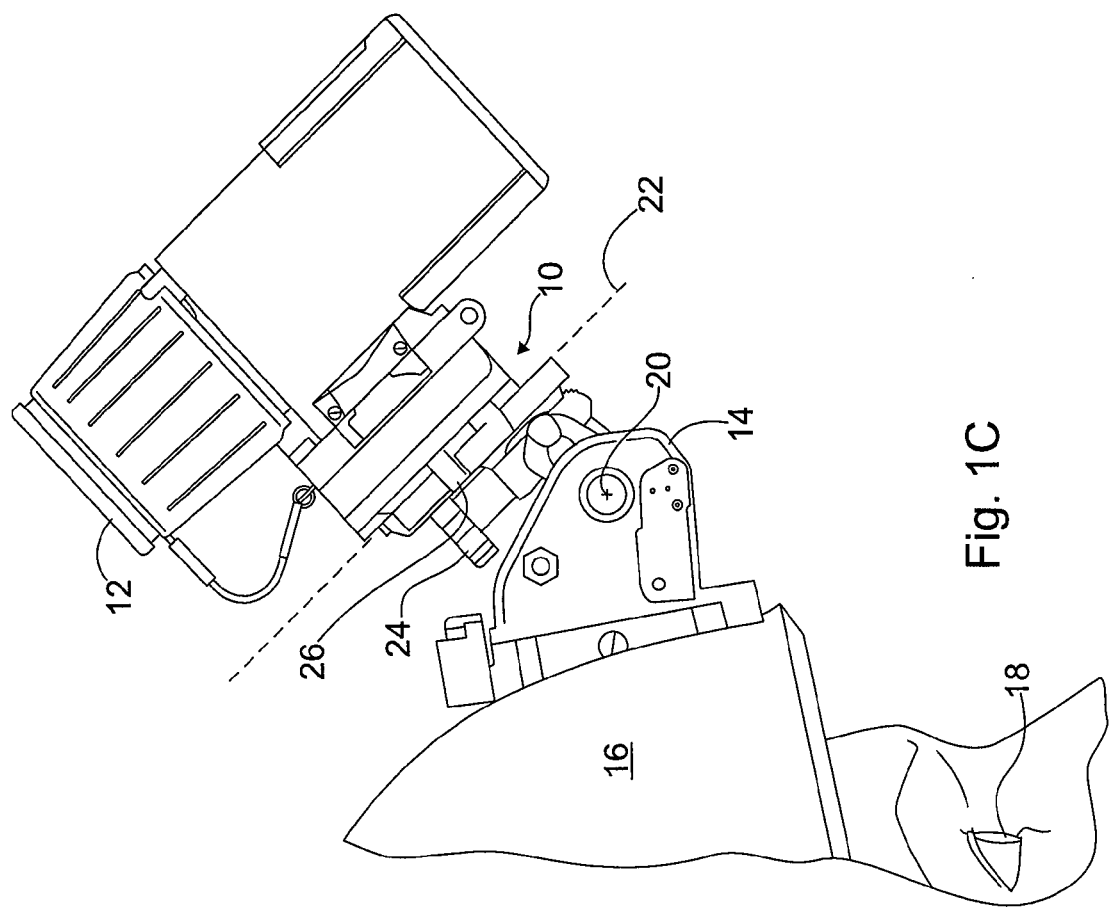
FIG. 1C depicts the night vision device of FIG. 1A oriented in a stowed position.

Referring specifically to FIGS. 1A-1C, and according to an aspect of the invention, an optical device adjustment mechanism 10 (hereinafter 'mechanism 10') is provided. The mechanism 10 is coupled between an optical device 12 and a mounting structure 14 of a field helmet 16. The optical device 12 may be binoculars or night vision binoculars, for example, or any other type of optical device.

FIG. 1A depicts optical device 12 oriented in a deployed position and proximal to eye 18 of the user. FIG. 1B depicts optical device 12 of FIG. 1A oriented in a deployed position and distal to eye 18 of the user. FIG. 1C depicts the optical device 12 of FIG. 1A oriented in a stowed position outside of the user's field of vision. Although not shown, mounting structure 14 of the field helmet 16 includes a device for retaining optical device 12 in the stowed position shown in FIG. 1C.

The mechanism 10 is configured to facilitate rotation of optical device 12 about axis of rotation 20 between the proximal and distal positions shown in FIGS. 1A and 1B, respectively. Specifically, a handwheel 24 is provided on mechanism 10 for rotating optical device 12. The mechanism 10 is also configured to permit translation of optical device 12 along an axis of translation 22 with respect to field helmet 16. A lever 26 is provided on mechanism 10 for translating optical device 12 along the axis of translation 22 to position optical device 12 either towards or away from the user's eye 18. According to one aspect of the invention, axis of translation 22 is oriented substantially orthogonal to the axis of rotation 20.

Figure 2:
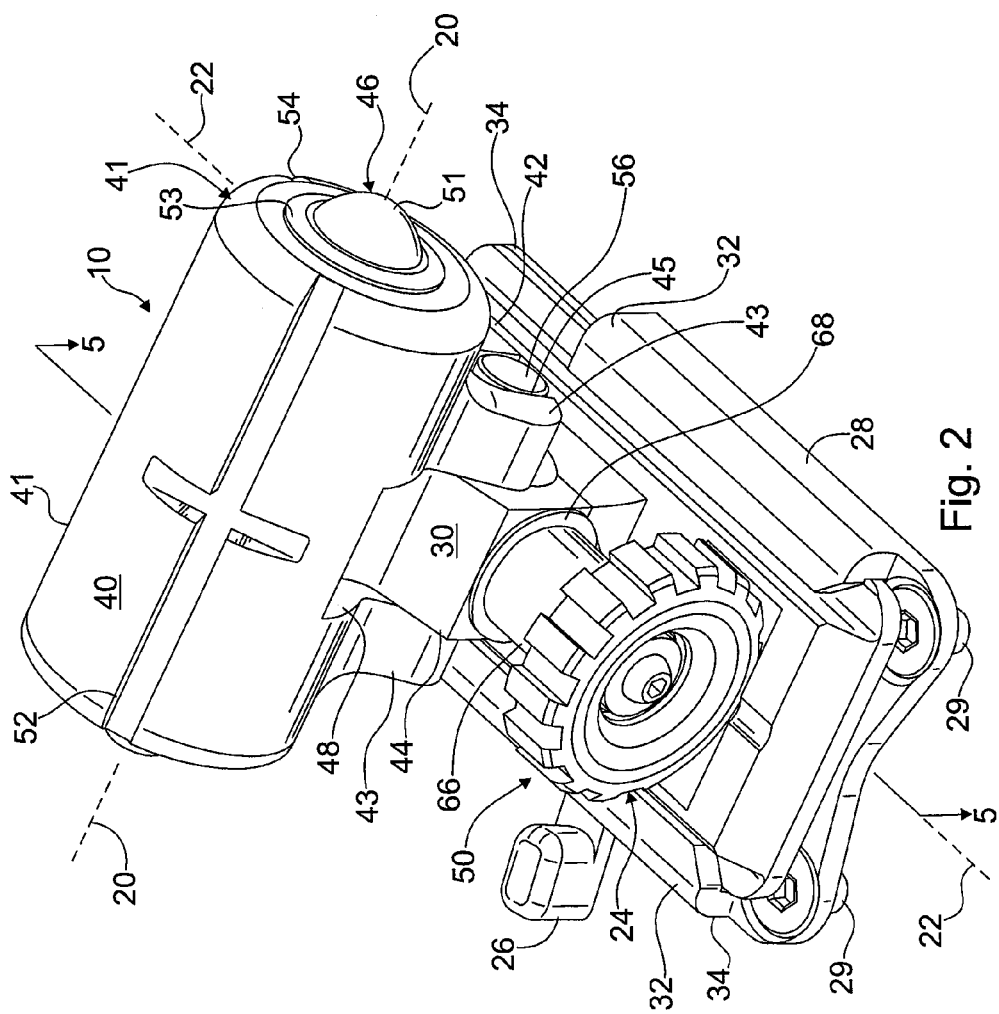
FIG. 2 depicts a perspective view from the top side of the optical device adjustment mechanism of FIGS. 1A-1C, according to another aspect of this invention.
Figure 3:
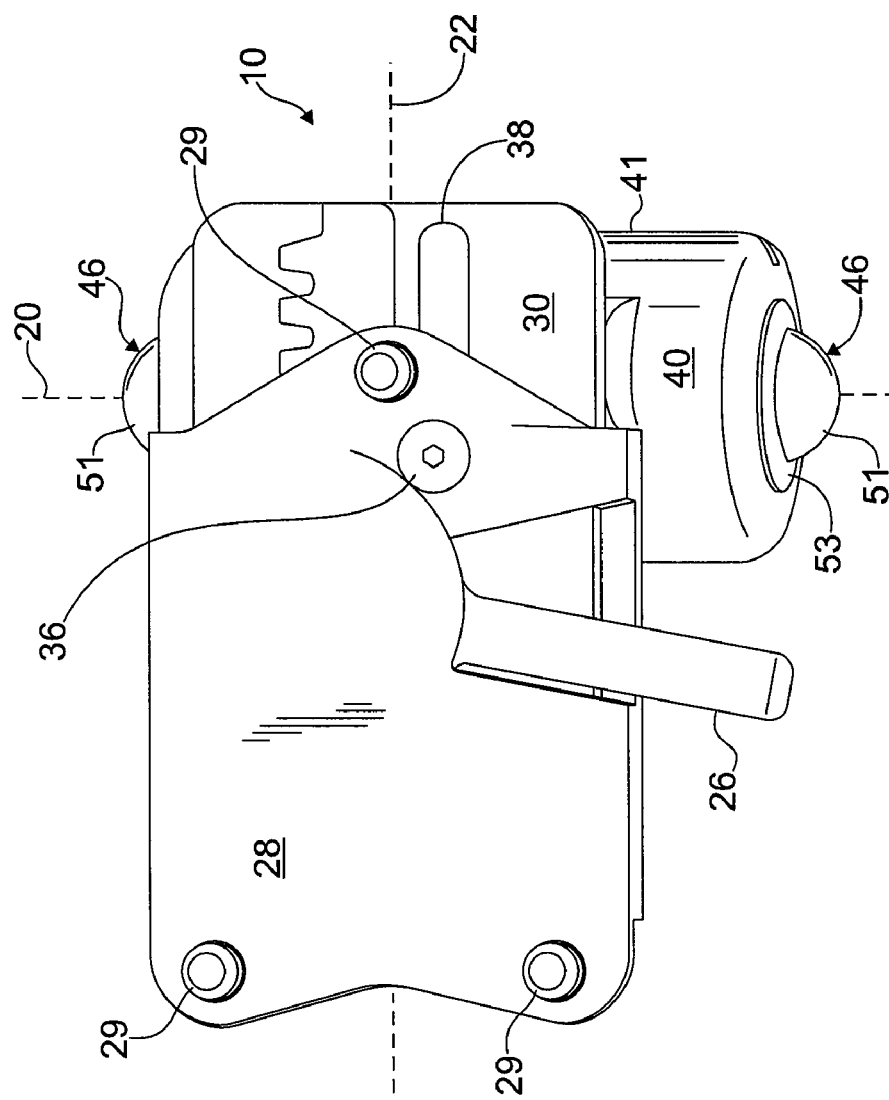
FIG. 3 depicts a perspective view from the bottom side of the optical device adjustment mechanism of FIG. 2.
Figure 4:
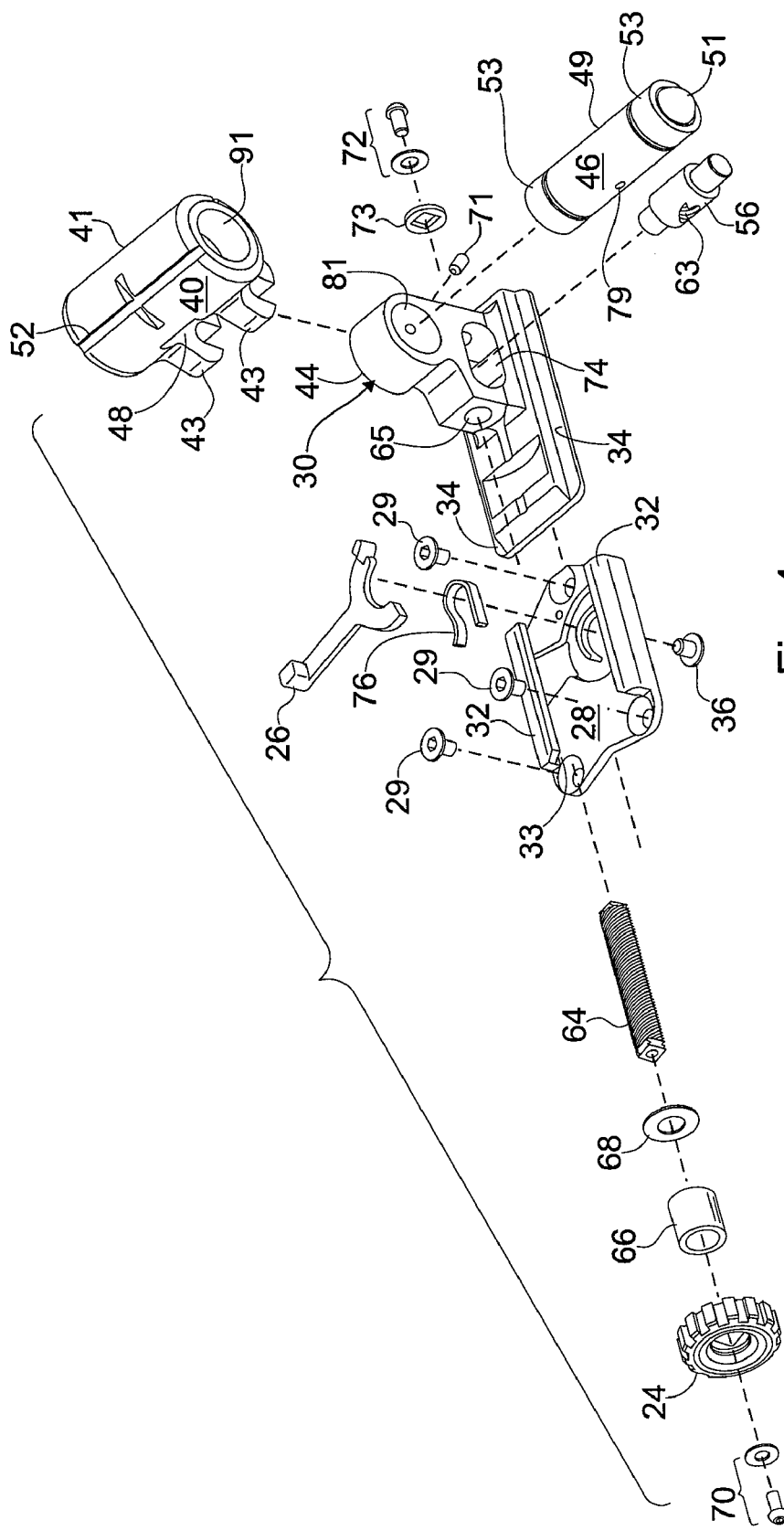
FIG. 4 depicts an exploded view of the optical device adjustment mechanism of FIG. 2.
Figure 5:
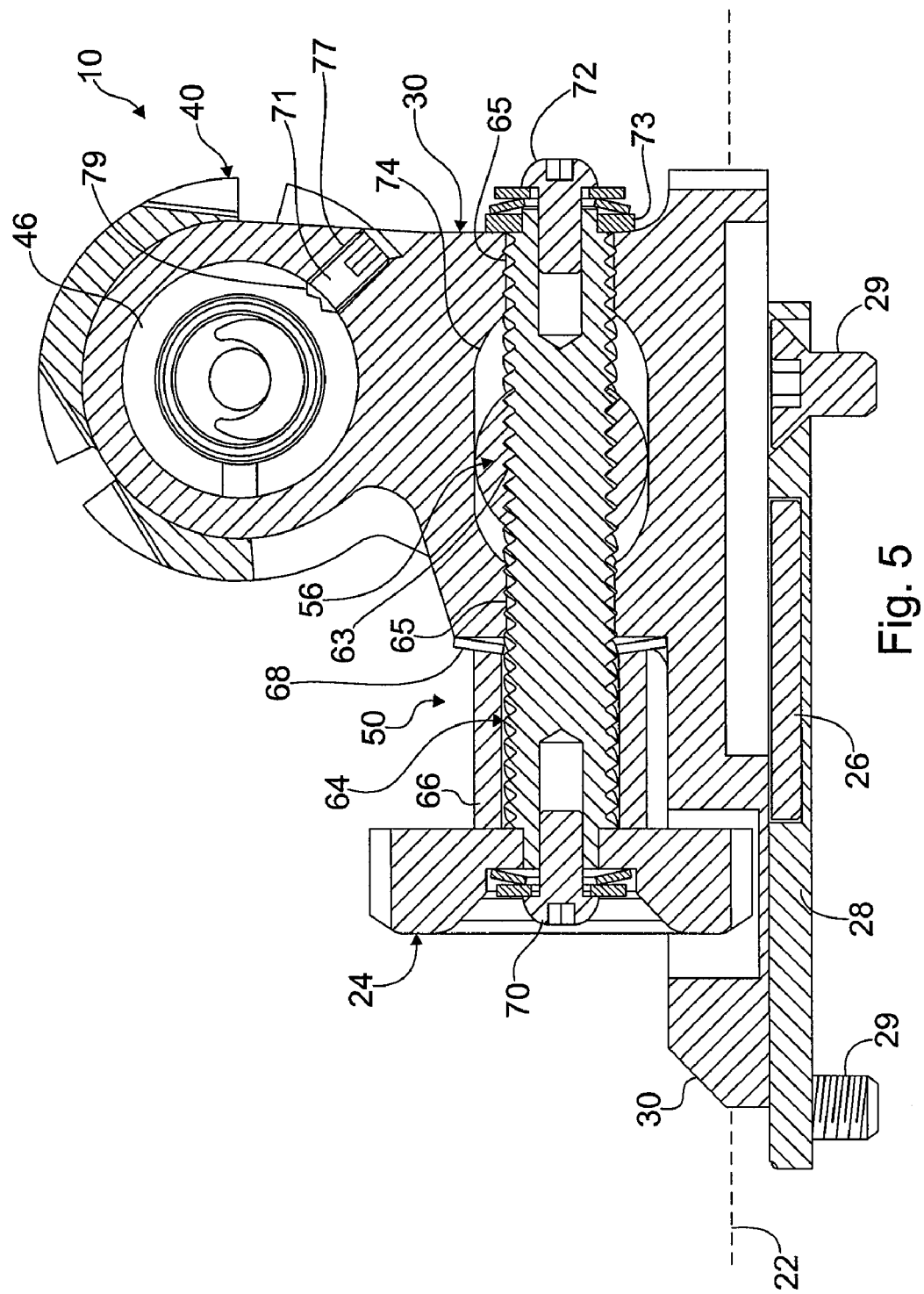
FIG. 5 depicts a cross-sectional view of the optical device adjustment mechanism of FIG. 2 taken along the lines 5-5.

Referring now to FIGS. 2-5, FIGS. 2 and 3 depict perspective views of mechanism 10 from the top side and the bottom side, respectively, FIG. 4 depicts an exploded view of apparatus 10, and FIG. 5 depicts a cross-sectional view of mechanism 10 taken along the lines 5-5 of FIG. 2. As best shown in FIG. 2, mechanism 10 generally includes an optical device mounting component 28 (hereinafter component 28) for coupling to optical device 12, a field helmet mounting component 40 (hereinafter component 40) for coupling to mounting structure 14 of a field helmet 16, an intermediate component 30 positioned between component 28 and component 40, a tilt adjustment mechanism 50 for rotating optical device 12 about axis of rotation 20, and a spring-loaded lever 26 for permitting translation of optical device 12 along axis of translation 22.

The component 28 is mounted to optical device 12 by three fasteners 29. Those skilled in the art will understand that component 28 may be mounted to optical device 12 by any means known in the art, such as by weld, adhesive, fasteners, clips, clamps, magnetism, and so forth. The component 28 is slideably coupled to intermediate component 30 along axis of translation 22. As described in greater detail with reference to FIGS. 6-7B, lever 26 is engaged with component 28 and intermediate component 30 for either permitting or prohibiting translation of component 28 (along with optical device 12) along axis of translation 22.

More specifically, component 28 includes rail segments 32 positioned on opposing longitudinal sides thereof. Each rail segment 32 defines an interior channel 33 (see FIG. 4). The intermediate component 30 includes a generally rectangular base portion 42 including flanges 34 provided on longitudinal sides thereof. Each interior channel 33 of rail segment 32 is sized to accommodate a flange 34 of intermediate component 30. In use, flanges 34 of intermediate component 30 slide within recesses 33 of component 28 along axis of translation 22.

As best shown in FIG. 3, component 28 includes a guide pin 36 for translating within a complimentary groove 38 disposed along the bottom side of intermediate component 30. The guide pin 36 extends into groove 38. The groove 38 extends along axis of translation 22. In use, groove 38 limits the range of translation of component 28 along axis 22. Specifically, the ends of groove 38 prevent component 28 from becoming detached from intermediate component 30. The width of groove 38 is slightly larger than the diameter of guide pin 36 to facilitate smooth translation of component 28. Those skilled in the art will recognize that intermediate component 30 may include guide pin 36 and component 28 may include a complimentary groove 38 to achieve the same purpose. Moreover, guide pin 36 and groove 38 are optional components and may be omitted.

According to one aspect of the invention, intermediate component 30 is rotatively coupled to component 40 about axis of rotation 20 between the proximal position shown in FIG. 1A and the distal position shown in FIG. 1B. As best shown in FIG. 4, thru-holes 81 and 91 are provided in component 30 and component 40, respectively, for accommodating a pivot pin 46. The cylindrical portion 44 of intermediate component 30 is positioned within a recess 48 disposed within cylindrical body 41 of component 40 for aligning thru-holes 81 and 91. The pivot pin 46 is inserted through thru-holes 81 and 91 to rotatively couple components 30 and 40 together. The pivot pin 46 permits respective rotation of intermediate component 30 and component 40 in either a clockwise or a counter clockwise direction about axis of rotation 20.

The pivot pin 46 includes a substantially cylindrical body 49, two bearings 51 positioned on each end of body 49, and a cap 53 mounted to each end of body 49 and positioned over a respective bearing 51. The axis of rotation 20 is coincident with the central axis of body 49. According to one aspect of the invention, bearings 51 are spring loaded such that assembly 10 may be removed from mounting structure 14 of field helmet 16 (see FIGS. 1A-1C). Although not shown, one or more springs may be positioned within body 49, or positioned between body 49 and bearings 51, for urging bearings 51 in the outward direction to the position shown in FIG. 2.

In use, a user depresses both spring loaded bearings 51 to remove mechanism 10 (along with optical device 12) from mounting structure 14 of field helmet 16. Once bearings 51 are sufficiently depressed to clear mounting structure 14, optical device 12 may be translated away and detached from mounting structure 14. Because mechanism 10 is removable from field helmet 16, multiple users wearing field helmet 16 may easily share optical device 12. The spring loaded bearings 51 return to their original position upon release. Thus, a user depresses both spring loaded bearings 51 to reattach mechanism 10 (along with optical device 12) to mounting structure 14 of field helmet 16.

According to the exemplary embodiment shown in FIGS. 1-7B, the intermediate component 30 is rotatively coupled to component 40 about axis of rotation 20. The mechanism 10 includes a tilt adjustment mechanism 50 (hereinafter mechanism 50) for inducing relative rotation (i.e., tilting) of intermediate component 30 (and optical device 12) about axis of rotation 20. Because optical device 12 is mounted to component 28, and component 28 is coupled to intermediate component 30, rotation of intermediate component 30 induces rotation of optical device 12 between the proximal and distal positions shown in FIGS. 1A and 1B, respectively.

As best shown in FIG. 5 and according to one aspect of the invention, mechanism 50 generally includes a translating member 56, a threaded shaft 64 threadedly engaged with translating member 56, and a handwheel 24 fixedly mounted to threaded shaft 64. The handwheel 24 is mounted to threaded shaft 64 by fastener 70. The threaded shaft 64 is positioned through a clearance hole 65 provided in intermediate component 30. The threaded shaft 64 is threadedly engaged through a threaded aperture 63 disposed in translating member 56. The translating member 56 is moveably positioned within an elongated slot 74 of intermediate component 30. The elongated slot 74 of component 40 orthogonally intersects clearance hole 65. The opposing end of threaded shaft 64 is positioned through clearance hole 65 and is coupled to a washer 73 by fastener 72. The washer 73 is sandwiched between the rear surface of component 30 and a captive washer of fastener 72.

As best shown in FIG. 2, opposite ends of translating member 56 are positioned within open-ended "U"-shaped slots 45 formed in two prongs 43 extending from opposing sides of component 40. The prongs 43 extend from cylindrical body 41 of component 40 in a parallel manner. Each open-ended "U"-shaped slot 45 is formed at the terminal end of a prong 43. The longitudinal axis of slots 45 is substantially radially aligned with axis of rotation 20 and substantially orthogonal to axis of translation 22.

While translating member 56 is shown engaging "U"-shaped slots 45 formed in prongs 43, translating member 56 may engage any surface of component 40, and is not limited to engaging a "U"-shaped slot 45 of component 40. Additionally, although not shown, a "U"-shaped slot (or other surface) may be defined on intermediate component 30 or component 28 for rotating optical device 12 about axis of rotation 20. Accordingly, it can be broadly stated that translating member 56 is moveably translatable for engaging a surface (e.g., slot 45) of either the field helmet mounting component or the optical device mounting component.

As best shown in FIG. 5, the specific arrangement of collar 66, spring 68, washer 73 and intermediate component 30 limits translation of threaded shaft 64 upon rotation of threaded shaft 64. More particularly, spring 68 is positioned between collar 66 and intermediate component 30 for urging collar 66, handwheel 24 and threaded shaft 64 in a direction away from washer 73 thereby compressing washer 73 against intermediate component 30. The spring 68 may be a helical compression spring, a Belleville washer, or any other resilient element known in the art, for example. It should be understood, however, that while threaded shaft 64 is limited from translating, it is free to rotate about its longitudinal axis.

According to one aspect of the invention, a fastener 71 secures intermediate component 30 to pivot pin 46 to prevent inadvertent rotation of intermediate component 30 (and optical device 12) with respect to component 40. As best shown in FIG. 5, fastener 71 is positioned through (or threaded into) an aperture 77 provided on the rear side of intermediate component 30. The fastener 71 is threadedly engaged with a hole 79 provided in pivot pin 46. Engagement between fastener 71, pivot pin 46 and intermediate component 30, prevents inadvertent rotation of intermediate component 30 (and optical device 12) about axis 20 with respect to component 40.

As best shown in FIG. 5 and according to one exemplary use of the invention, rotation of handwheel 24 induces rotation of threaded shaft 64. Rotation of threaded shaft 64 induces translation of translating member 56 within slot 74. Translation of translating member 56 within slot 74 induces rotation of component 30 about axis of rotation 20. It should be understood that component 40 does not rotate about axis of rotation 20 upon rotation of handwheel 24 because field helmet is strapped to a user's head in use.

Accordingly, translation of translating member 56 induces rotation of components 28 and 30 about axis of rotation 20 with respect to component 40. Optical device 12 rotates about axis 20 along with component 28 as shown in FIGS. 1A and 1B. In summary, rotation of handwheel 24 tilts optical device 12 with respect to field helmet 16 and eye 18 of the user in either a clockwise or counterclockwise direction.

While component 40 does not rotate about axis 20 by rotating handwheel 24, component 40 is capable of manual rotation between a deployed position (see FIGS. 1A and 1B) and a stowed position (see FIG. 1C). As best shown in FIG. 2, two recesses 52 and 54 are disposed on cylindrical body 41 of component 40. In the deployed position of optical device 12 (as shown in FIGS. 1A and 1B), recess 54 is releasably engaged with a device (not shown) provided on mounting structure 14 of field helmet 16. In the stowed position of optical device 12 (as shown in FIG. 1C), recess 52 is releasably engaged with the aforementioned device (not shown) provided on mounting structure 14 of field helmet 16. The recesses 52 and 54 may be separated by about 90 degrees, for example, according to one exemplary embodiment.

Figure 7A:
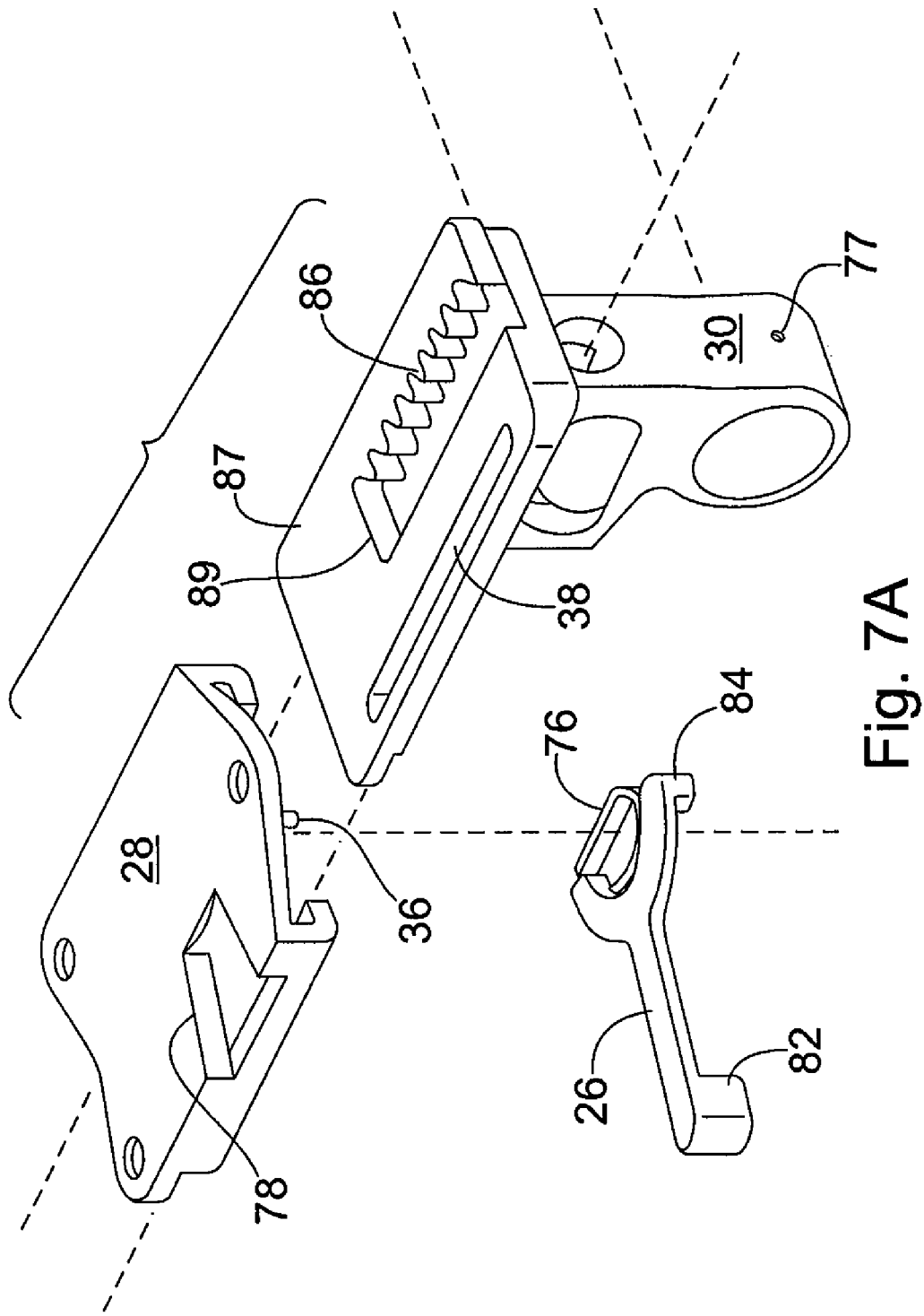

Referring now to FIGS. 6, 7A and 7B, according to one exemplary embodiment, mechanism 10 includes a spring-loaded lever 26 for selectively permitting translation of optical device mounting component 28 along axis of translation 22 with respect to field helmet mounting component 40 (and field helmet 16). It should be understood that optical device 12 is fixedly mounted to component 28 and therefore translates along with component 28.

FIG. 6 depicts a partial assembly view of mechanism 10 including optical device mounting component 28, lever 26 and spring 76. The lever 26 is positionable between a locked position (as shown) and an unlocked position. In a locked position, lever 26 prevents translation of component 28 with respect to intermediate component 30, and in an unlocked position lever 26 permits translation of component 28 with respect to intermediate component 30.

The mounting component 28 includes a "G"-shaped channel 80 embedded within the thickness dimension "T" for accommodating spring 76 and portion 83 of lever 26. The "G" shaped channel is also illustrated in FIG. 7B. The spring 76 is constrained within "G" shaped channel 80, and portion 83 of lever 26 is rotatably constrained within "G" shaped channel 80. The spring 76 urges portion 83 to a locked position (as shown). The spring 76 may be integrally formed with lever 26, or spring 76 may be a separate component, as shown. In assembly, lever 26 and spring 76 are sandwiched between components 28 and 30, as shown in FIG. 5. Accordingly the depth of channel 80 is preferably greater than the thickness dimension of lever 26 and spring 76 to permit translation of component 28 with respect to component 30 without interference.

The spring 76 biases lever 26 towards the locked position, as shown in FIG. 6. A handle 82 is provided on lever 26 for rotating lever 26 (in a counterclockwise direction with reference to FIG. 6) to an unlocked position. More particularly, rotation of lever 26 towards the unlocked position causes portion 83 of lever 26 to compress spring 76. Upon release, lever 26 returns to its original locked position.

A recess 78 is formed in the body of component 28 extending from "G" shaped channel 80. The recess 78 defines an opening "W" a longitudinal side of component 28 to accommodate rotation of lever 26 within channel 80 between the locked and unlocked positions.

A tooth 84 is disposed on an end of "U"-shaped portion 83 of lever 26 for selective engagement with a surface of intermediate component 30. In the locked position, tooth 84 is engaged with component 30 and in the unlocked position tooth 84 is disengaged from component 30, as best described with reference to FIGS. 7A and 7B.

FIGS. 7A and 7B depict exploded partial assembly views of mechanism 10 including lever 26, spring 76, intermediate component 30 and component 28. According to one aspect of the invention, tooth 84 of lever 26 is positionable for selective engagement with gear teeth 86 defined on the lower surface of intermediate component 30. The gear teeth 86 extend parallel to axis of translation 22. In the locked position of lever 26, tooth 84 of lever 26 is engaged between adjacent gear teeth 86 of intermediate component 30, thereby preventing translation of component 28 with respect to intermediate component 30 along axis 22.

In the unlocked position, tooth 84 of lever 26 is positioned within slot 89 of component 30 but is separated from gear teeth 86 of intermediate component 30 to permit translation of component 28 along axis 22 with respect to intermediate component 30. Once lever 26 is rotated to the unlocked position, the user can manually translate component 28 (and optical device 12) along axis 22.

According to an alternative embodiment not illustrated herein, "G"-shaped channel 80 and recess 78 may be disposed on intermediate component 30, and gear teeth 86 may be disposed on component 28, without altering the functionality of mechanism 10. Furthermore, while lever 26 includes tooth 84 and intermediate component 30 includes gear teeth 86, those skilled in the art will recognize that other devices exist to facilitate selective translation of component 28 along axis of translation 22.

According to the exemplary embodiment illustrated in FIGS. 1-7B, intermediate component 30 is slideably coupled to component 28 along axis of translation 22, and rotatably coupled to component 40 about axis of rotation 20. If, however, rotation of component 28 is not desired, component 28 may be slideably coupled directly to component 40 along axis of translation 22. Alternatively, if translation of component 28 is not desired, component 28 may be rotatably coupled directly to component 40. Such alternative embodiments are described in greater detail with reference to FIGS. 8 and 9.

FIG. 8 depicts an exemplary embodiment of a translation adjustment mechanism 110 that is configured to permit translation of optical device along axis of translation 122. The mechanism 110 generally includes a field helmet mounting component 140 for releasably mounting to a field helmet, an optical device mounting component 128 for mounting to an optical device (not shown), and a spring loaded lever 126 for selectively permitting translation of component 128 with respect to component 140 along axis of translation 122. In this embodiment, component 128 is coupled directly to component 140 for translating along the axis of translation between an extended position and a retracted position.

The mechanism 110 is similar to mechanism 10 of FIGS. 1A-7B. The spring-loaded lever 126 is the same as lever 26 of the previous embodiment. Thus, similar to mechanism 10, a tooth (not shown) is disposed on lever 126 for selective engagement with a set of gear teeth (not shown) that are defined on the lower surface of component 140.

Unlike mechanism 10, however, mechanism 110 does not include an angular adjustment mechanism 50. Thus, component 128 is incapable of rotation with respect to component 140. The intermediate component (i.e., item 30) shown in FIG. 2 is integral with component 140. Because mechanism 110 does not include an independent intermediate component, flanges 134 are disposed on component 140 in this embodiment to facilitate translation of component 128 along axis of translation 122.

Figure 9:
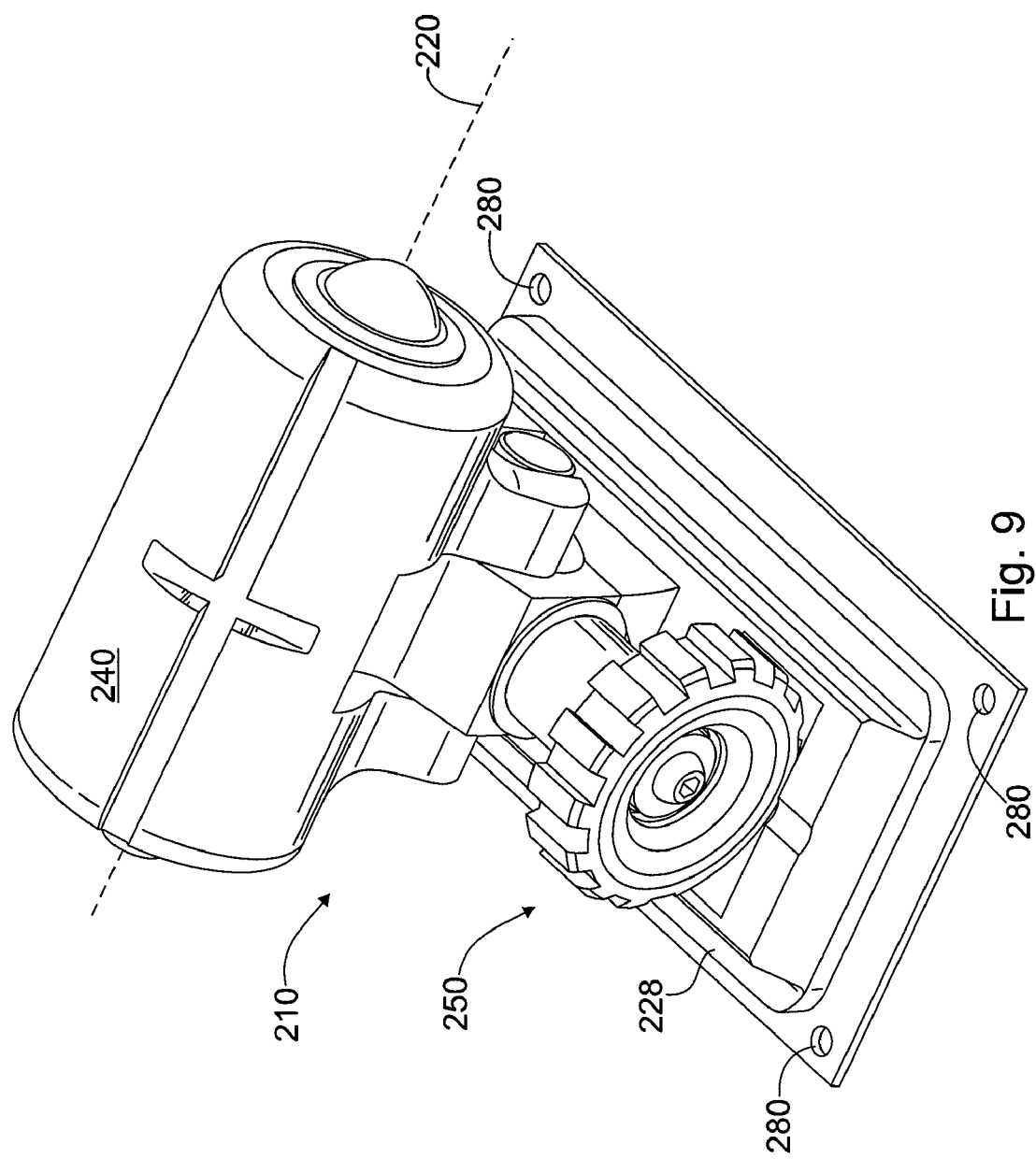
FIG. 9 depicts a perspective view from the top side of an optical device adjustment mechanism, according to still another aspect of this invention, wherein the optical device adjustment mechanism is configured for rotational adjustment of an optical device with respect to a field helmet.

FIG. 9 depicts an exemplary embodiment of a tilt adjustment mechanism 210 (hereinafter mechanism 210) that is configured to rotate the optical device (not shown) about axis of rotation 220 with respect to a field helmet (not shown). In this embodiment, the field helmet mounting component 240 is rotatably coupled directly to the optical device mounting component 228. In this embodiment, the intermediate component (i.e., item 30) shown in FIG. 2 is integral with component 228.

The mechanism 210 generally includes a field helmet mounting component 240 for releasably mounting to a field helmet, an optical device mounting component 228 for mounting to an optical device, and a tilt adjustment mechanism 250 for rotating component 228 (and the optical device) about axis of rotation 220 with respect to component 240.

The mechanism 210 is similar to mechanism 10 of FIGS. 1A-7B. More particularly, component 228 includes apertures 280 for receiving fasteners to mount component 228 to the optical device. The component 240 is releasably mountable to mounting structure 14 of a field helmet 16. Unlike mechanism 10 of FIGS. 1A-7B, however, mechanism 210 is incapable of permitting translation of component 228 (and the optical device) with respect to component 240 (and the field helmet). (and the integral intermediate component)

Although the invention is illustrated and described herein with reference to specific embodiments, the invention is not intended to be limited to the details shown. Rather, various modifications may be made in the details within the scope and range of equivalents of the claims and without departing from the spirit of the invention. For example, component 40, 140 or 240 may be mounted to the optical device, and component 28, 128 or 228 may be mounted to the field helmet without departing from the scope of the invention.

What is claimed is:

1. A mechanism for adjusting the angular position of an optical device with respect to a field helmet, said mechanism comprising:
    an optical device mounting component for coupling to the optical device;
    a field helmet mounting component for coupling to the field helmet, said field helmet mounting component being rotatably coupled to the optical device mounting component about an axis of rotation; and
    an angular adjustment mechanism engaged between the optical device mounting component and the field helmet mounting component, said angular adjustment mechanism including:
        a translating member being moveably translatable along an axis of translation for engaging a surface of either the field helmet mounting component or the optical device mounting component, said translating member being a pin having a substantially cylindrically shape, and a threaded shaft being threadedly engaged with a threaded aperture of the pin, wherein rotation of the threaded shaft directly induces translation of the pin in both directions along the axis of translation, and translation of the pin along the axis of translation induces rotation of the optical device mounting component about the axis of rotation for adjusting the angular position of the optical device with respect to the field helmet.

2. The mechanism of claim 1, wherein translation of the pin along the axis of translation induces rotation of the optical device mounting component about the axis of rotation between a first position wherein the optical device is oriented distal to the user's eye and a second position wherein the optical device is oriented proximal to the user's eye.

3. The mechanism of claim 1, wherein the optical device is a night vision optical device.

4. The mechanism of claim 1, wherein the surface of either the field helmet mounting component or the optical device mounting component is defined by a slot that is sized for receiving the pin.

5. The mechanism of claim 4, said slot being substantially radially aligned with the axis of rotation and substantially orthogonal to the axis of translation.

6. The mechanism of claim 1, said angular adjustment mechanism further comprising a rotatable handwheel attached to the threaded shaft for rotating the threaded shaft.

7. The mechanism of claim 6, said angular adjustment mechanism further comprising a spring positioned between the rotatable handwheel and either the optical device mounting component or the field helmet mounting component for limiting translation of the shaft upon rotation of the shaft.

8. The mechanism of claim 1, said field helmet mounting component being rotatably coupled to the field helmet about the axis of rotation between a stowed position and a deployed position.

9. The mechanism of claim 1, said field helmet mounting component being releasably coupled to a mounting portion of the field helmet.

10. A night vision apparatus configured for attachment to a field helmet comprising:

a night vision device;

an optical device mounting component coupled to the night vision device;

a field helmet mounting component for coupling to the field helmet, said field helmet mounting component being rotatably coupled to the optical device mounting component about an axis of rotation, said field helmet mounting component defining a slot; and an angular adjustment mechanism engaged between the optical device mounting component and the field helmet mounting component, said angular adjustment mechanism including:

a pin being moveably translatable along an axis of translation and positioned within the slot of the field helmet mounting component, and a threaded shaft being threadedly engaged with a threaded aperture of the pin, wherein rotation of the threaded shaft directly induces translation of the pin in both directions along the axis of translation, and translation of the pin along the axis of translation induces rotation of the optical device mounting component about the axis of rotation for adjusting the angular position of the optical device with respect to the field helmet.

* * * * *